United States Patent [19]

Ueda et al.

[11] Patent Number: 4,705,722
[45] Date of Patent: Nov. 10, 1987

[54] GLAND PACKING

[75] Inventors: Takahisa Ueda, Sanda; Tomikazu Shiomi, Kobe, both of Japan

[73] Assignee: Nippon Pillar Packing Co., Ltd., Japan

[21] Appl. No.: 935,495

[22] Filed: Nov. 26, 1986

[30] Foreign Application Priority Data

Jun. 18, 1986 [JP] Japan ................... 61-142078

[51] Int. Cl.$^4$ ............................................. D06P 7/00
[52] U.S. Cl. ....................... 428/365; 57/230; 57/231; 87/1; 87/6; 87/9; 277/230; 428/367; 428/373; 428/374; 428/377; 428/391; 428/408
[58] Field of Search ............... 57/230, 231; 87/1, 6, 87/9; 277/230, DIG. 6; 428/365, 367, 373, 374, 377, 391, 408

[56] References Cited

U.S. PATENT DOCUMENTS 4,559,862 12/1985 Case et al. .................... 428/367

Primary Examiner—Marion C. McCamish
Attorney, Agent, or Firm—Jones, Tullar & Cooper, P.C.

[57] ABSTRACT

A gland packing having increased compressibility, increased allowable limit of twist, increased tensile strength, and excellent serviceability and versatility characteristics is disclosed which comprises a plurality of flexible graphite sheets cut to a width of less than 5 mm and laid in superposed relation to one another, the laid-up cut sheets being covered with a fiber material by knitting or braiding to form a knitting thread, the knitting thread being twisted. Also, a gland packing having a further increased tensile strength is disclosed wherein a plurality of strands of the knitting thread are gathered and twisted or braided. In addition, a gland packing having improved contacting and sealing properties is disclosed wherein the covering fiber material exposed on the surface of the packing is removed at least in part.

14 Claims, 5 Drawing Figures

GLAND PACKING

BACKGROUND OF THE INVENTION

1. Field of the Invention

This invention relates to a gland packing made of flexible graphite for use in a shaft seal part of the like portion of a hydraulic machine.

2. Prior Art

A variety of gland packings in which flexible graphite is used as a base material have hitherto been known for use in a shaft seal part or the like portion of a hydraulic machine, for example.

Gland packings of this sort are manufactured by various techniques, such as laminating, die molding, chip molding, and ribbon packing. However, these techniques require that the graphite material must be previously molded into a ring shape conforming to the diametral size of a shaft with which such packing is to be used; as such, the packing cannot be used with any shaft having a different diameter. Therefore, such packing lacks versatility in use. Another difficulty with such packing is that since flexible graphite is of low tensile strength and brittle in itself, once the packing is mounted in position it is extremely difficult to remove same when replacement is required, which means less usability. Further, aforesaid manufacturing techniques individually have drawbacks of their own. The laminating technique involves the problem of poor yield, which leads to higher cost. Where the die molding or chip molding technique is employed, dies or metal molds are required, which means higher cost, and the packing produced is less versatile. The ribbon packing technique provides no good workability.

These difficulties may be overcome by forming the flexible graphite into a cord-like structure so that it may be used by being cut to a specified length conforming to the diameter of the shaft, as is the case with such other type of packing as fiber braided or knitted; but the trouble is that flexible graphite cannot be braided or knitted because, as pointed out above, it is in itself of low tensile strength and so brittle that its compressibility and allowable limit of twist are both extremely low. Therefore, it has hitherto been considered impossible to use such packing in such way as is usual with aforesaid fiber braided or knitted type of packing, that is, in such a way that the braided or knitted packing is cut to length according to the diametral size of the shaft with which it is to be used, the so cut packing being then wound about the outer periphery of the shaft.

SUMMARY OF THE INVENTION

This invention is intended to overcome aforesaid difficuties and has as its primary object the provision of a gland packing in which a flexible graphite sheet cut to a width of less than 5 mm is used as a core material in order to advantageously utilize a characteristic feature of flexible graphite in sheet form in particular that if such sheet is cut to a width of less than 5 mm, both its compressibility and its allowable limit of twist are significantly increased, and in which the flexible graphite sheet is covered with a fiber material, whereby the synergistic action of the fiber material and flexible graphite sheet permits twisting or a combination of knitting and twisting, thus providing improved usability and improved versatility.

The object of the invention can be accomplished by laying a plurality of flexible graphite sheets cut to a width of less than 5 mm in superposed relation to one another, covering the surface of the laid-up graphite sheets with a fiber material through knitting or braiding to form a knitting thread, then twisting the knitting thread.

The object of the invention can also be accomplished by placing a plurality of flexible graphite sheets cut to a width of less than 5 mm in superposed relation to one another, covering the surface of the laid-up graphite sheets with a fiber material through knitting or braiding to form a knitting thread, and twisting or braiding a plurality of strands of the knitting thread.

The object of the invention can also be accomplished by laying a plurality of flexible graphite sheets cut to a width of less than 5 mm in superposed relation to one another, covering the surface of the laid-up graphite sheets with a fiber material through knitting or braiding to form a knitting thread, twisting or braiding a plurality of strands of the knitting thread into a gland packing in the form of a cord-like structure, and removing at least a part of the exposed covering fiber material on the surface of the packing according to the purpose for which the packing is used.

DETAILED DESCRIPTION OF THE PREFERRED EMBODIMENTS

Figure 1:
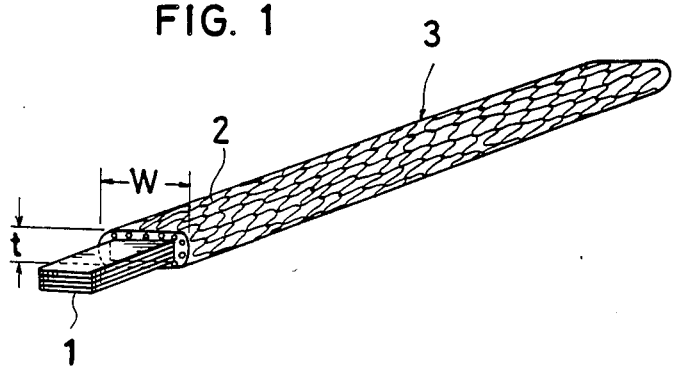
FIG. 1 is a partially cutaway view in perspective showing one embodiment of the invention.
Figure 2:
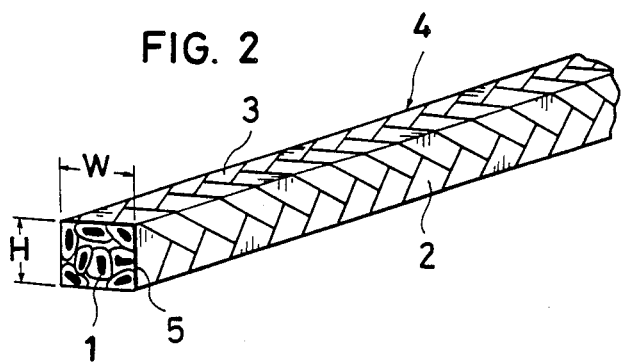
FIG. 2 is a partially cutaway perspective view showing one form of cord-like structure according to the invention, which is formed by square braiding eight knitting threads.
Figure 3:
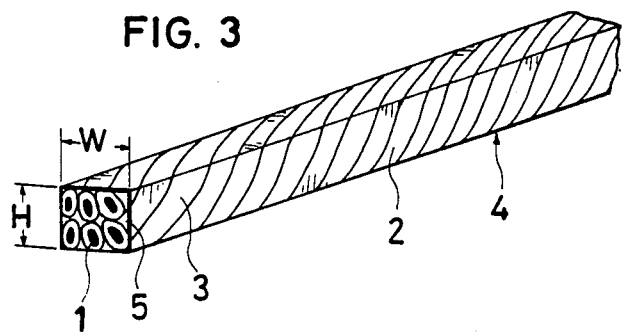
FIG. 3 is a partially cutaway perspective view showing another form of cord-like structure, which is formed by twisting six knitting threads together.

Referring to FIGS. 1 to 3 in which there are shown embodiments, six flexible graphite sheets cut to a width of 3 mm, each having a thickness of 0.38 mm, are laid one on top of another, and the surface thereof is covered with an Aramid fiber of 40 cotton counts by knitting, so that a knitting thread 3 ($W=4.8$ mm $\times t=3.2$ mm) is first formed as shown in FIG. 1.

Nextly, eight strands of the knitting thread 3 are square braided into a cord-like structure 4 ($W=8.1$ mm $\times H=8.1$ mm) as shown in FIG. 2, and the Aramid fiber (an aromatic polyamide fiber) 2 exposed on the surface of the cord-like structure is burned off by means of a burner, the surface being then impregnated with a sealer 5 comprising silicone oil, scale-form graphite, rubber-based adhesive or the like.

Whilst, six strands of the knitting thread 3 are bundled, and the bundle is subjected to roll forming while being twisted 20 turns/m, whereby a cord-like structure 4 ($W=5.6$ mm $\times H=5.6$ mm) as shown in FIG. 3 is formed. The Aramid fiber 2 exposed on the surface of the cord-like structure 4 is burned off by means of the burner and subsequently the surface is impregnated with aforesaid sealer 5.

Figure 4:
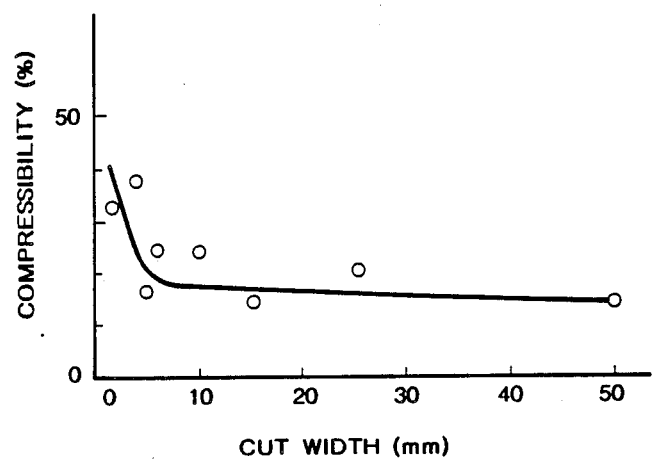
FIG. 4 is a graph showing the relationship between flexible graphite sheet cut width and its compressibility.
Figure 5:
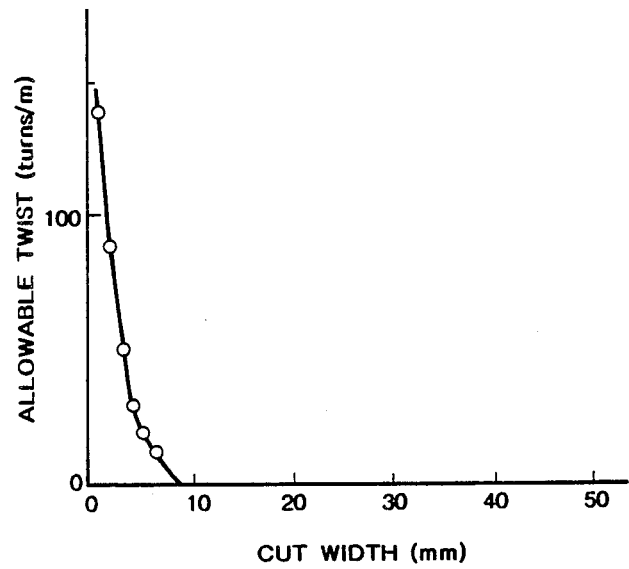
FIG. 5 is a graph showing the relationship between flexible graphite sheet cut width and its allowable limit of twist.

FIG. 4 presents experimental results on the relationship between cut width and compressibility with respect to a flexible graphite sheet having a thickness of 0.35 mm, and FIG. 5 presents experimental results on the relationship between cut width and allowable limit of twist with respect to a 1 meter long flexible graphite sheet having a thickness of 0.35 mm.

It can be seen from these figures that the flexible graphite sheet has a characteristic feature that if its cut width is less than 5 mm, both its compressibility and its allowable limit of twist are remarkably increased.

This fact assures easy and accurate formation of such cord-like structure 4 from the knitting thread 3 comprising a plurality of flexible graphite sheets 1 cut to a width of 3 mm each and laid in superposed relation to one another as described above with respect to the first and second embodiments. In other words, eight-thread square braiding and also twisting can be satisfactorily carried out without breakage being caused to the flexible graphite sheet 1 or the core material, that is, to the knitting thread 3. Therefore, the cord-like structure 4 may be readily cut to a specified length conforming to the diameter of the shaft, for example, for use as gland packing. This means improved usability and versatility.

The cord-like structure 4 thus obtained has excellent characteristics which enable it to be used as gland packing as it is, but preferably the Aramid fiber 2 exposed on the surface of the cord-like structure 4 is burned off by a burner, whereby a smoother surface can be obtained which is free from any possible cause of local resistance against a part with which the cord-like structure 4 is in contact when used as gland packing, improved sealing performance being thus assured.

In the above described embodiments, a plurality of knitting threads 3 are gathered and they are twisted or braided, but needless to say, it is to be understood that a single strand of knitting thread 3 may be twisted into a gland packing.

(EXPERIMENTAL EXAMPLES

I. Specimen No. 1

A packing formed by laying 6 flexible graphite sheets, each of 0.38 mm thick×3 mm wide, one on top of another, knitting them with a stainless steel filament of 0.1 mm dia into a knitting thread, entwining eight strands of the knitting thread into a square braid, then impregnating the surface of the square braid with a sealing compound composed of silicone oil, a scaleform graphite material, and a rubber-based adhesive.

II. Specimen No. 2

A packing formed by laying 6 flexible graphite sheets, each of 0.38 mm thick×3 mm wide, one on top of another, knitting them with an Aramid spun yarn of 40 counts into a knitting thread, forming a square braid in same way as in the case of Specimen No. 1, then impregnating the surface of the square braid with the sealing compound.

III. Specimen A

A conventional packing produced by compression molding an expanded graphite sheet into a ring shape.

IV. Specimen B

A conventional asbestos packing.

Experimental results with above listed four varieties of valve packings in rest condition are shown in Table 1 below. It is noted that in the experiments each, 6 pieces of ring-shaped packing, each having an inner diameter of 32 mm and an outer diameter of 48 mm, were used under the following conditions: fastening pressure 300 kg/cm$^2$, N$_2$ gas 21 kg/cm$^2$, and dry heat 300° C.×2 hr.

TABLE 1

|  |  | No. 1 | No. 2 | A | B |
|---|---|---|---|---|---|
| At normal temperatures | Compressibility % | 15.1 | 17.0 | 11.2 | 14.0 |
|  | Leakage cc/min | 0 | 0.06 | 0 | 0 |
|  | Slide resistance kg/cm$^2$ | 3.60 | 3.69 | 14.5 | 5.6 |
| Slide resistance after 2 hr dry heat exposure at 300° C. kg/cm$^2$ |  | 3.30 | 4.35 | 8.62 | — |
| During cooling | Leakage cc/min | 8.8 | 0.5 | 0 | — |
|  | Slide resistance kg/cm$^2$ | 2.70 | 2.77 | 9.26 | — |
| During increased cold fastening | Compressibility % | 16.8 | 18.5 | 12.3 | — |
|  | Leakage cc/min | 4.0 | 0.3 | 0 | — |
|  | Slide resistance kg/cm$^2$ | 10.5 | 9.28 | 14.1 | — |

As is apparent from Table 1 above, both No. 1 and No. 2 specimens were higher in initial compressibility and lower in slide resistance than conventional packings A and B.

Results of experiments under hot water conditions are shown in Table 2 below. The specimen packings used were same in size and quantity as in the Table 1 experiments. Test conditions were: fastening pressure 350 kg/cm$^2$; hot water 100 kg/cm$^2$×250° C.

TABLE 2

|  |  | No. 1 | No. 2 | A + B | B | A |
|---|---|---|---|---|---|---|
| Cold fastening pressure 348 kg/cm$^2$ | Compressibility % | 18.4 | 20.9 | 14.4 | 14.2 | 14.3 |
|  | Slide resistance kg/cm$^2$ | 8.02 | 10.8 | 21.6 | 25.4 | 19.8 |
| 1st cycle after 5 hr (1080 double strokes) | Leakage cc/h | 0 | 0 | 0.4 | 18 | 1.3 |
|  | Slide resistance kg/cm$^2$ | 16.5 | 14.4 | 8.30 | 5.20 | 13.0 |
| 2nd cycle after 5 hr (1080 double strokes) | Leakage cc/h | 0 | 0 | 0.3 | 65 | 2.0 |
|  | Slide resistance kg/cm$^2$ | 18.2 | 13.7 | 7.69 | 5.79 | 13.0 |

As can be clearly seen from Table 2 above, both No. 1 and No. 2 specimens showed less initial slide resistance, and only when the covering fiber and flexible graphite sheet were exposed on the surface with time, their slide resistance was generally of same order as that of specimen A representing a conventional packing. No or little leak, if any, occurred with No. 1, No. 2 specimens, their high reliability being thus proved.

In the above described specimens, a stainless steel filament of 0.1 mm dia and an Aramid fiber were used as fibers 2 for covering the flexible graphite sheets 1, but it is to be noted that in addition to such metallic filament or fiber, inorganic fibers, such as asbestos fiber, ceramic fiber, glass fiber, and carbon fiber, and organic fibers, such as cotton, rayon, phenolic fiber, Aramid, PBI, and PTFE, may be used depending upon the purpose for which the packing is used.

It should be noted in this conjunction that the removal of the fiber material exposed on the surface of cord-like structure 4 formed by using any of these fibers is carried out by one method selected from various techniques, such as burner treatment, chemical treatment, and hot water treatment.

As an alternative to such treatment for removing the whole of the covering fiber material, a similar treatment may be employed only for partial removal of the fiber portion of the cord-like structure, for example, the fiber present on the shaft sealing part, that is, a part of the fiber exposed on the surface.

According to the invention, the flexible graphite sheets used as a core material are cut to a width of less than 5 mm in order to provide increased compressibility and increased limit of allowable twist, and in addition a plurality of such cut sheets are laid in superposed relation to one another, so that the tensile strength and toughness of the flexible graphite may be greatly enhanced. Therefore, a cord-like structure can be readily and accurately formed by using a knitting thread formed by covering the surface of the superposed graphite cut sheets with a fiber by knitting or braiding.

Thus, it is now possible to cut such cord-like structure to a specified length according to the shaft diameter and form the so cut cord-like structure into an annular shape for use as gland packing, which has hitherto been considered impossible with a conventional packing of the type which is produced by pressure-molding a flexible graphite tape, or the so-called molded packing; this assures greater serviceability and greater versatility.

Furthermore, at least a part of the covering fiber material exposed on the surface of the knitted or braided packing, for example, such part of the fiber portion as will contact the outer periphery of the shaft and/or the inner periphery of the stuffing box, is removed to provide a smoother surface, which means better contacting performance and improved sealing properties.

What is claimed is:

1. A gland packing comprising a plurality of flexible graphite sheets cut to a width of less than 5 mm and laid in superposed relation to one another, the laid-up graphite sheets having their surface covered with a fiber material by knitting or braiding to form a knitting thread, said knitting thread being twisted.

2. A gland packing as set forth in claim 1, wherein the flexible graphite sheets are of 0.38 mm in thickness and 3 mm in width.

3. A gland packing as set forth in claim 2, wherein the flexible graphite sheets are six in number, one laid on top of another.

4. A gland packing as set forth in claim 1, wherein the knitting thread comprises flexible graphite sheets covered with an organic fiber material by knitting or braiding.

5. A gland packing as set forth in claim 4, wherein the knitting thread comprises flexible graphite sheets covered with an Aramid fiber of 40 cotton counts by knitting or braiding.

6. A gland packing as set forth in claim 1, wherein the knitting thread comprises flexible graphite sheets covered with an inorganic fiber material by knitting or braiding.

7. A gland packing as set forth in claim 1, wherein the knitting thread comprises flexible graphite sheets covered with a stainless steel filament of 0.1 mm in diameter by knitting or braiding.

8. A gland packing comprising a plurality of flexible graphite sheets cut to a width of less than 5 mm and laid in superposed relation to one another, the laid-up graphite sheets having their surface covered with a fiber material by knitting or braiding to form a knitting thread, a plurality of strands of said knitting thread being gathered and twisted or braided.

9. A gland packing as set forth in claim 8, wherein eight strands of said knitting thread are gathered and braided to form a square braid.

10. A gland packing as set forth in claim 8, wherein six strands of said knitting thread are gathered and twisted at the rate of 20 turns/m.

11. A gland packing comprising a plurality of flexible graphite sheets cut to a width of less than 5 mm and laid in superposed relation to one another, the laid-up graphite sheets having their surface covered with a fiber material by knitting or braiding to form a knitting thread, a plurality of strands of said knitting thread being gathered and twisted or braided to form a cord-like structure, said covering fiber material being removed at least in part which is exposed on the surface of said cord-like structure.

12. A gland packing as set forth in claim 11, wherein at least a part of the covering fiber material exposed on the surface of the cord-like structure is burned off by means of a burner.

13. A gland packing as set forth in claim 11, wherein at least a part of the covering fiber material exposed on the surface of the cord-like structure is removed by chemical treatment.

14. A gland packing as set forth in claim 11, wherein at least a part of the covering fiber material exposed on the surface of the cord-like structure is removed by hot water treatment.

* * * * *